(12) United States Patent
Beck et al.

(10) Patent No.: US 11,580,803 B2
(45) Date of Patent: *Feb. 14, 2023

(54) LOCKING DEVICE WITH MULTIPLE AUTHENTICATION DEVICES

(71) Applicant: Spectrum Brands, Inc., Middleton, WI (US)

(72) Inventors: Chasen Scott Beck, Costa Mesa, CA (US); Matthew Lovett, Lake Forest, CA (US)

(73) Assignee: Spectrum Brands, Inc., Middleton, WI (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/090,063

(22) PCT Filed: Mar. 29, 2017

(86) PCT No.: PCT/US2017/024684
§ 371 (c)(1),
(2) Date: Sep. 28, 2018

(87) PCT Pub. No.: WO2017/172871
PCT Pub. Date: Oct. 5, 2017

(65) Prior Publication Data
US 2020/0219345 A1   Jul. 9, 2020

Related U.S. Application Data

(60) Provisional application No. 62/315,707, filed on Mar. 31, 2016.

(51) Int. Cl.
*E05B 49/00* (2006.01)
*G07C 9/00* (2020.01)
*G06F 21/32* (2013.01)

(52) U.S. Cl.
CPC .......... *G07C 9/00563* (2013.01); *E05B 49/00* (2013.01); *G06F 21/32* (2013.01);
(Continued)

(58) Field of Classification Search
CPC .. G07C 2009/00222; G07C 2009/0019; G07C 9/00563; G07C 9/00309; G07C 9/0069; G07C 2009/00769; G06F 21/32
See application file for complete search history.

(56) References Cited

U.S. PATENT DOCUMENTS 4,062,056 A * 12/1977 Goodrich .............. G07C 9/0069
361/172
6,097,306 A * 8/2000 Leon ........................ G07C 9/38
340/5.1
(Continued)

FOREIGN PATENT DOCUMENTS

KR    200800666570    *  1/2010  ......... G07C 9/00142
TW          555927 A    10/2003
TW         M415952 U    11/2011

OTHER PUBLICATIONS

International Search Report and Written Opinion for PCT/US2017/024684 (dated May 31, 2017).
(Continued)

*Primary Examiner* — Hai Phan
*Assistant Examiner* — Son M Tang
(74) *Attorney, Agent, or Firm* — Merchant & Gould P.C.

(57) ABSTRACT

A locking device with a bolt movable between a locked position and an unlocked position. The locking device includes an electronic controller for selectively controlling movement of the bolt between the locked and unlocked position. At least two input devices are provided, such as a keypad, a biometric input, etc., which communicate an authentication code to the controller. The controller controls
(Continued)

movement of the bolt based on a valid authentication code received from any of the at least two input devices.

20 Claims, 9 Drawing Sheets

(52) U.S. Cl.
CPC ....... *G07C 9/0069* (2013.01); *G07C 9/00309* (2013.01); *G07C 2009/00769* (2013.01)

(56) References Cited

U.S. PATENT DOCUMENTS

| | | | | |
|---|---|---|---|---|
| 6,971,029 B1* | 11/2005 | Avery IV | ................ | G06F 21/41 |
| | | | | 726/26 |
| 8,438,652 B2* | 5/2013 | Weinstein | ............... | G06F 21/78 |
| | | | | 726/27 |
| 8,490,443 B2 | 7/2013 | Gokcebay | | |
| 9,672,673 B1* | 6/2017 | Gokcebay | ................ | G07C 9/29 |
| 10,679,441 B2* | 6/2020 | Lai | ...................... | E05B 37/0068 |
| 2004/0128508 A1* | 7/2004 | Wheeler | ............. | H04L 63/0442 |
| | | | | 713/170 |
| 2005/0075135 A1* | 4/2005 | Cromer | ................... | G06F 21/85 |
| | | | | 455/558 |
| 2006/0152348 A1* | 7/2006 | Ohtaki | .................... | B60R 25/24 |
| | | | | 340/426.1 |
| 2007/0096872 A1* | 5/2007 | Nguyen | ............ | H04W 12/0608 |
| | | | | 340/5.61 |
| 2007/0289012 A1 | 12/2007 | Baird | | |
| 2008/0041943 A1* | 2/2008 | Radicella | ........... | G07C 9/00571 |
| | | | | 235/382 |
| 2008/0174403 A1* | 7/2008 | Wolpert | ................... | G07C 9/27 |
| | | | | 340/5.61 |
| 2010/0031713 A1* | 2/2010 | Brown | ................ | E05B 47/0676 |
| | | | | 70/91 |
| 2010/0085153 A1* | 4/2010 | Smith | ..................... | G06F 21/32 |
| | | | | 340/5.82 |
| 2011/0140837 A1* | 6/2011 | Lam | ........................ | G06F 21/31 |
| | | | | 340/5.51 |
| 2011/0205016 A1* | 8/2011 | Al-Azem | ................ | G06F 21/32 |
| | | | | 340/5.52 |
| 2011/0226849 A1* | 9/2011 | Padilla | ................. | G06K 7/1098 |
| | | | | 235/375 |
| 2013/0008213 A1* | 1/2013 | Brown | .................... | E05B 47/00 |
| | | | | 70/264 |
| 2013/0085796 A1* | 4/2013 | Ruffolo | ................ | G06Q 10/105 |
| | | | | 705/7.18 |
| 2013/0205373 A1* | 8/2013 | Jaudon | .................... | H04W 4/06 |
| | | | | 726/4 |
| 2014/0070003 A1* | 3/2014 | Radicella | ................. | G07C 9/20 |
| | | | | 235/382 |
| 2014/0118107 A1* | 5/2014 | Almomani | ......... | G07C 9/00309 |
| | | | | 340/5.22 |
| 2014/0250956 A1* | 9/2014 | Chong | ............... | G07C 9/00174 |
| | | | | 70/278.1 |
| 2014/0320261 A1* | 10/2014 | Davis | ................. | G06K 7/10227 |
| | | | | 340/5.61 |
| 2014/0353983 A1* | 12/2014 | Vetter | ..................... | E05C 3/042 |
| | | | | 292/197 |
| 2015/0077252 A1* | 3/2015 | King | ...................... | G08B 13/06 |
| | | | | 340/542 |
| 2015/0116080 A1 | 4/2015 | Cregg et al. | | |
| 2015/0218850 A1 | 8/2015 | Uyeda et al. | | |
| 2015/0228133 A1 | 8/2015 | Capaldi-Tallon | | |
| 2015/0279136 A1 | 10/2015 | Lovett et al. | | |
| 2016/0019736 A1* | 1/2016 | Radicella | ........... | G07C 9/00571 |
| | | | | 235/382 |
| 2016/0042602 A1* | 2/2016 | Phan | .................... | G07F 17/3237 |
| | | | | 463/29 |
| 2016/0133071 A1* | 5/2016 | Henderson | .......... | E05B 47/0001 |
| | | | | 70/277 |
| 2016/0241999 A1* | 8/2016 | Chin | ........................ | G07C 9/32 |
| 2016/0300410 A1* | 10/2016 | Jones | ................. | G06K 9/00348 |
| 2016/0368455 A1* | 12/2016 | Kim | ........................ | B60R 25/25 |
| 2017/0018956 A1* | 1/2017 | Geiszler | ................ | H02J 7/00034 |
| 2019/0031145 A1* | 1/2019 | Trelin | ...................... | G07C 9/37 |
| 2019/0100940 A1* | 4/2019 | Imanuel | ............. | G07C 9/00309 |
| 2022/0075853 A1* | 3/2022 | Rana | ................. | H04L 63/0846 |

OTHER PUBLICATIONS

Search Report for European Patent Application No. 17776525.2 (dated Oct. 24, 2019).
Search Report for Taiwanese Patent Application No. 106110703, dated Dec. 7, 2020.

\* cited by examiner

LOCKING DEVICE WITH MULTIPLE AUTHENTICATION DEVICES

RELATED APPLICATIONS

This application is a National Stage Application of PCT/US2017/024684, filed Mar. 29, 2017, which claims the benefit of U.S. Provisional Application Ser. No. 62/315,707, filed Mar. 31, 2016, which applications are incorporated herein by reference. To the extent appropriate, a claim of priority is made to each of the above disclosed applications.

TECHNICAL FIELD

The present disclosure relates generally to locksets. In particular, the present disclosure relates to a lockset that, in some embodiments, is electronically controlled with an auxiliary authentication input device.

BACKGROUND AND SUMMARY

Locksets typically comprise mechanical parts to lock and unlock a door. In some situations, an electronic lockset is attached to a door to provide easier access to unlock and lock a door. That is, a user is not required to carry around a key to unlock or lock the door. The electronic locksets provide access to the door even when the user does not have a physical key to provide more secure ways of unlocking and locking a door.

With some electronic locksets, for example, attempts have been made to create an intuitive and direct way of unlocking and locking a door with an electronic key that is wirelessly communicated to the lock, such as with a mobile device or key fob. The electronic key allows a user to interact with the door lock when the mobile device and/or key fob is within proximity of the door. As a result, these electronic locksets require a mobile device, key fob or a physical key to unlock and lock the door. This can be problematic when the user does not have any of these devices to access the door.

According to one aspect, this disclosure provides an auxiliary authentication input device for use with an electronic lockset having a primary authentication input device for inputting an authentication code that initiates movement of a mechanical locking assembly between a locked position and an unlocked position. This allows the user to operate the lock with the auxiliary authentication input device in a keyless manner without needing a phone or keyfob. In some embodiments, the auxiliary authentication input device includes a keypad with a plurality of user-selectable buttons and a wireless communication unit configured to communicate with an electronic lockset. A controller is provided that is configured to electronically transfer user-selection of the plurality of buttons to the electronic lockset through the wireless communication unit.

According to another aspect, this disclosure provides a lockset with a latch assembly, a motor, a controller, a wireless communication unit, and at least two input devices. The latch assembly includes a bolt movable between an extended position and a retracted position. The motor is configured to move the bolt between the extended position and the retracted position. The controller is configured to electronically control the motor to control movement of the bolt between the extended position and the retracted position responsive to receiving a valid authentication code. The wireless communication unit is in electrical communication with the controller. The at least two input devices, which could be a keypad and/or a biometric input in some embodiments, communicate an authentication code with the controller. The controller controls movement of the bolt based on a valid authentication code received from any of the at least two input devices.

According to a further aspect, this disclosure provides a method for installing an auxiliary authentication input device for use with an electronic lockset having a primary authentication input device for inputting an authentication code that initiates movement of a mechanical locking assembly between a locked position and an unlocked position. This allows an existing wireless locking device to be retrofitted with an auxiliary authentication input device that does not require the use of a phone or keyfob. If the user does not have a phone or keyfob while accessing the door, the auxiliary input device could be used to operate the locking device. The method includes the step of mounting the auxiliary authentication input device onto the lockset with a cylinder guard, the input device having an opening dimensioned to receive the lockset. The opening is lined up with the cylinder guard of the lockset. The auxiliary authentication input device is then secured to the lockset or another surface.

BRIEF DESCRIPTION OF THE DRAWINGS

The detailed description makes reference to the accompanying figures in which.

DETAILED DESCRIPTION OF THE DRAWINGS

Figure 1:
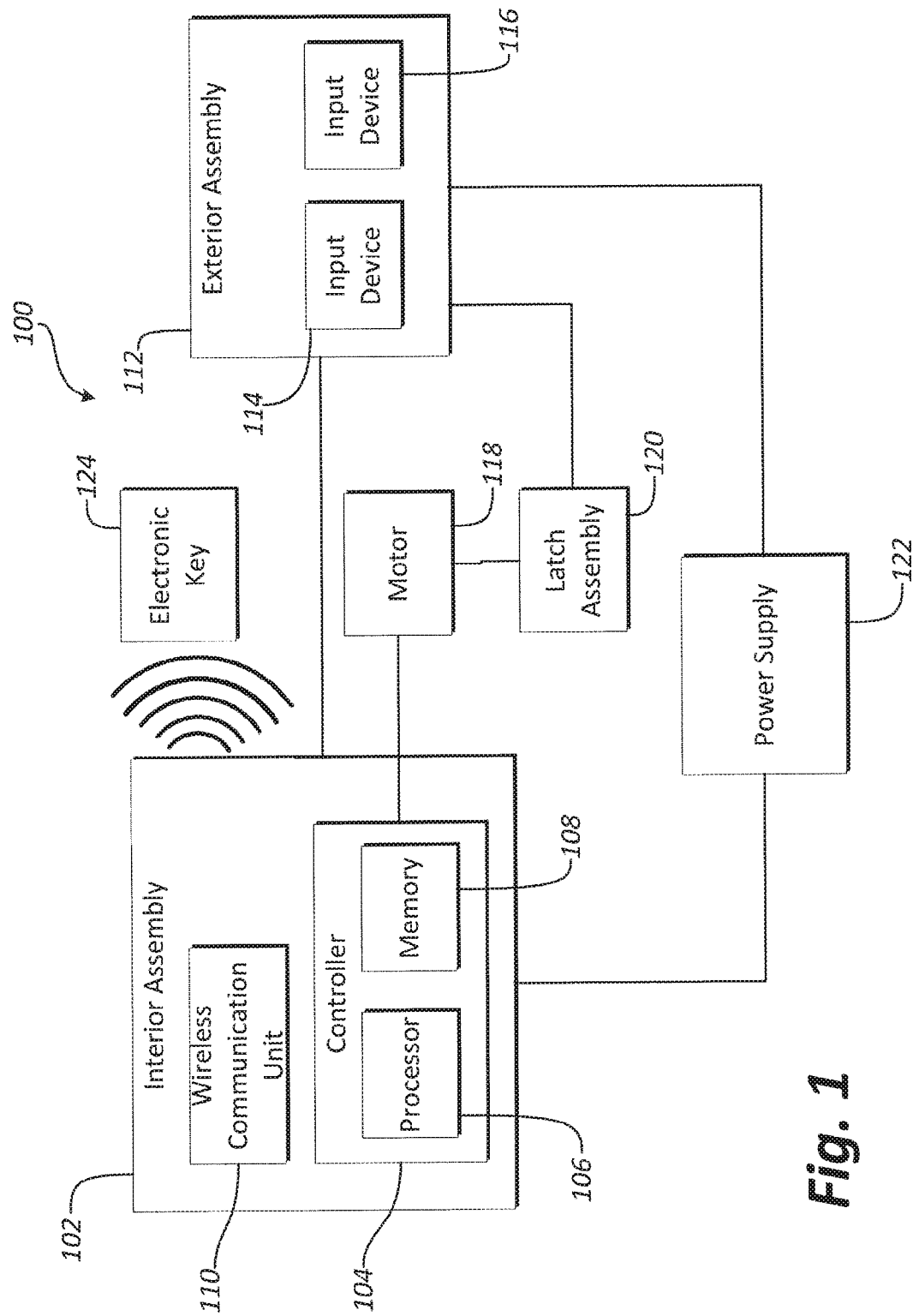
FIG. 1 is a simplified block diagram of an example lockset system for electronically controlling a motor to move a deadbolt between an unlocked and locked position according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 shows an example lockset system 100 according to an embodiment of the disclosure. In the example shown, the lockset system 100 includes an interior assembly 102, an exterior assembly 112, a motor 118, a latch assembly 120, and a power supply 122. Typically, the interior assembly 102 is mounted on the inside of a door, while the exterior assembly 112 is mounted on the outside of a door. The motor 118 is shown to be separate from the interior assembly 102. In another embodiment, the motor 118 may be inside the interior assembly 102. The latch assembly 120 is typically mounted in a bore formed in the door and is connected to the motor 118. The latch assembly 120 may include a bolt movable between an extended position and a retracted position. Typically, the extended position relates to a locked position and the retracted position relates to an unlocked position. The term "inside" is broadly used to denote an area inside a door and "outside" is also broadly used to mean an area outside a door. For example, with an exterior entry door, the interior assembly 102 may be mounted inside a building and the exterior assembly 112 may be mounted outside a building. In another example, with an interior door, the interior assembly 102 may be mounted inside a room secured by the lockset system 100 located inside a building, and the exterior assembly 112 may be mounted outside the secured room. The lockset system 100 is applicable to both interior and exterior doors. The lockset system 100 may also be used in such a way to secure any room with the interior assembly 102 located on the inside of the room and the exterior assembly 112 located on the outside of the room. The lockset system 100 may also be used in a way where the interior assembly 102 is located outside the door and the exterior assembly 112 is located inside the door.

In the embodiment shown, the interior assembly 102 includes a controller 104 and a wireless communication unit 110 to communicate with an electronic key 124. Although this embodiment shows the wireless communication unit 110 included in the interior assembly 102 for purposes of example, in some cases a wireless communication unit could also be provided in the exterior assembly 112. The electronic key 124 may be embodied as a key fob, a smartphone, a wireless communication device, etc. The interior assembly 102 may communicate with the electronic key 124 using the wireless communication unit 110 through Bluetooth™, Wi-Fi, etc. The controller 104 includes a processor 106 to process instructions stored on a memory 108. The controller 104 is electronically connected to the motor 118. In another embodiment, the interior assembly 102 may also include the motor 118 as described above. The interior assembly 102 is powered by the power supply 122. The power supply 122 may be embodied as batteries, a wall outlet, a solar panel, etc. The power supply 122 may also include other components (not shown) to convert the power to a usable form for the interior assembly 102. The interior assembly 102 is in electrical communication with the exterior assembly 112.

In the embodiment shown, the exterior assembly 112 includes at least two input devices 114, 116. The input devices 114, 116 may be a keypad, a touch surface, a biometric sensor, or any other device to receive an input, such as to receive an electronic key for authentication. The exterior assembly 112 is connected to the latch assembly 120 to manually actuate a bolt between the extended position and the retracted position. The exterior assembly is powered by the power supply 122. In the embodiment shown, the power supply 122 is connected to both of the interior assembly 102 and the exterior assembly 112. In another embodiment, there may be another power supply (not shown) that provides power to the exterior assembly 112 separately from the power supply 122.

In one embodiment, the interior assembly 102 may actuate the motor 118 through the controller 104 to change the bolt of the latch assembly 120 between the extended and the retracted positions. The interior assembly 102 may receive signals from the exterior assembly 112 to actuate the motor 118 between the extended and the retracted positions. The input devices 114, 116 may be used to receive an authentication code to send to the interior assembly 102. The interior assembly 102 may receive the input and verify the input matches the authentication code in order to actuate the motor to change the bolt of the latch assembly 120 between the extended and the retracted position.

In one embodiment, one of the input devices 114, 116 may be a keypad. The keypad may have a plurality of user-selectable buttons to input an authentication code. The keypad may further send signals for each user-selection that is made to the interior assembly 102 through the exterior assembly 112 for the controller 104 to authenticate the user-selection to determine whether the user-selection is a valid authentication code. In another embodiment, the exterior assembly 112 may interpret the signals from the keypad and authenticate the user-selection to see if the user-selection is the valid authentication code. If the exterior assembly 112 validates the user-selection, then the exterior assembly 112 may send the valid authentication code to the interior assembly 102 to actuate the motor to move the bolt of the latch assembly 120 between the extended and the retracted position.

In one embodiment, one of the input devices 114, 116 may be a biometric sensor. By way of example, the biometric sensor may be a fingerprint sensor, an iris sensor, a facial recognition sensor, a voice recognition sensor, or any other type of biometric sensor that detects the user based on one or more physical attributes. For example, the biometric sensor could send a signal representative of the biometric input to the interior assembly 102 for the controller 104 to authenticate the user. In some embodiments, if the controller 104 verifies that the biometric data presented by the biometric sensor matches an authorized user, and the controller 104 could actuate the motor 118 to move the bolt between the extended and retracted positions. In another embodiment, the exterior assembly 112 may interpret the biometric data from the biometric sensor and determine whether the user is authenticated. In some embodiments, if the user is not validated based on the biometric data, whether the analysis is performed by the interior assembly 102 or the exterior assembly 112, the controller 104 may initiate wireless authentication with the wireless communication unit if the electronic key 124 is in proximity to the exterior assembly 112.

In one embodiment, one of the input devices 114, 116 may be a user-selectable surface configured to initiate a wireless authentication process. The user-selectable surface may be a mechanical button, capacitive touch surface, or any other user-selectable surface. The interior assembly 102 includes the wireless communication unit 110 to communicate with the electronic key 124 for authenticating the user. For example, the electronic key 124 may be embodied as a key fob or a mobile device. The interior assembly 102 may receive the valid authentication code from the exterior assembly 112 upon an initiation of an authentication process. In some embodiments, the user-selectable surface may initiate wireless authentication with the wireless communication unit if the electronic key 124 is in proximity to the exterior assembly 112.

In one embodiment, a form of two-factor authentication could be provided in which the controller 104 may need inputs from both input devices 114, 116 in order to actuate the motor 118 to move the bolt of the latch assembly 120 between the extended and the retracted positions. For example, one input device 114 could be a user-selectable surface to initiate wireless authentication and the other input device 116 could be a keypad to enter a pin code (or enter biometric data). An input from the user-selectable surface 114 with the electronic key 124 nearby and user-selection from the keypad 116 (or biometric sensor) may be needed in order to initiate the authentication process. The interior assembly 102 may switch between single-authentication of one input device 114 or 116 and dual-authentication of both of the input devices 114, 116. The user-selectable surface 114 can send a signal to the controller 104 to actuate the motor to move the bolt of the latch assembly 120 to a locked position. The keypad 116 may have a button to send a signal to the controller 104 to actuate the motor to move the bolt of the latch assembly 120 to a locked position.

Figure 2:
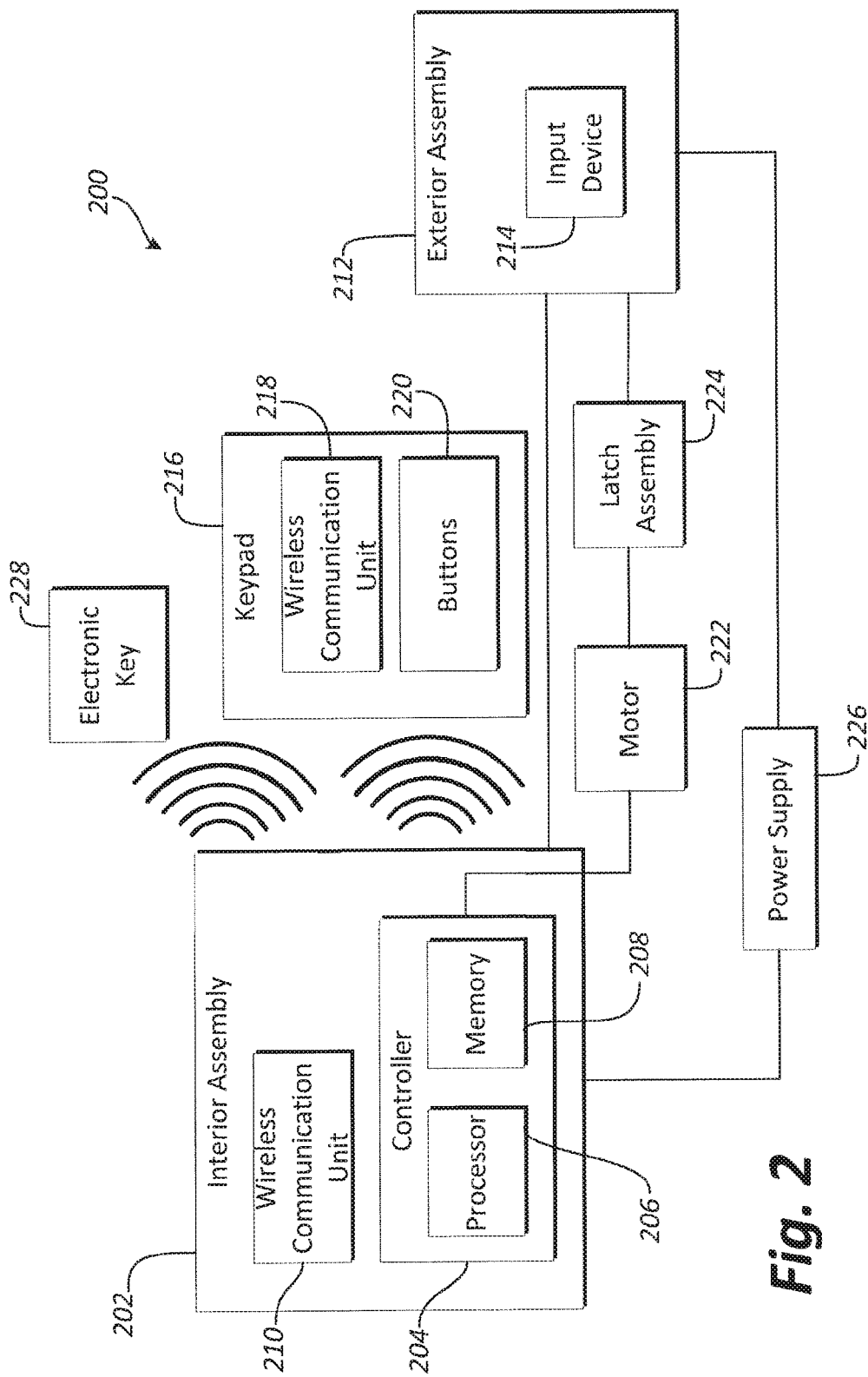
FIG. 2 is a simplified block diagram of another example lockset system for electronically controlling a motor to move the deadbolt between an unlocked and a locked position according to an embodiment of the disclosure.

FIG. 2 shows another example lockset system 200 according to another embodiment of the disclosure. The lockset system 200 is similar to the lockset system 100 in structure and operation except for the noted differences. In the example shown, the lockset system 200 includes an interior assembly 202, an exterior assembly 212, an auxiliary authentication input device embodied as a keypad 216, a motor 222, a latch assembly 224, and a power supply 226. The lockset system 200 may be used in a similar manner to the lockset system 100. The motor 222 is shown to be separate from the interior assembly 202. In another embodiment, the motor 222 may be inside the interior assembly 202. The latch assembly 224 is typically mounted in a bore formed in a door the lockset system 200 is attached to and is connected to the motor 222. The latch assembly 224 may include a bolt movable between an extended position and a retracted position.

Similarly to lockset system 100, the interior assembly 202 includes a controller 204 and a wireless communication unit 210 to communicate with an electronic key 228. As discussed above with respect FIG. 1, the wireless communication unit 110 included only in the interior assembly 102 is shown for purposes of example. In some cases, a wireless communication unit could also be provided in the exterior assembly 212. The electronic key 228 may be embodied as a key fob, a smartphone, a wireless communication device, etc. The interior assembly 202 may communicate with the electronic key 228 using the wireless communication unit 210 through Bluetooth™, Wi-Fi, etc. The controller 204 includes a processor 206 to process instructions stored on a memory 208. The controller 204 is electrically connected to the motor 222. In another embodiment, the interior assembly 202 may also include the motor 222 as described above. The interior assembly 202 is powered by power supply 226. The power supply 226 may be embodied as batteries, a wall outlet, a solar panel, etc. The power supply 226 may also include other components (not shown) to convert the power to a usable form for the interior assembly 202. The interior assembly 202 is in electrical connection with the exterior assembly 212.

In the embodiment shown, the exterior assembly 212 includes an optional input device 214. The input device 214 may be a keypad, a touch surface, a biometric sensor, or any other device to receive an input. Although the exterior assembly 212 is shown with the input device 214 for purposes of example, embodiments are contemplated in which the exterior assembly 212 does not include any input devices. Rather, all input could be provided by keypad 216 and wirelessly transmitted to interior assembly 202. In the embodiment shown, the lockset system 200 has the second input device 116 of lockset system 100 detached from the exterior assembly 212 and embodied as a keypad 216. For example, the second input device 116 could be a keypad added to an existing electronic lock that does not include a keypad for authentication. For example, this would allow a user to enter a pin code into the lockset system 100 using the keypad 216 if the user does not have a key fob or mobile device to wirelessly authenticate using an electronic key. In some embodiments, the second input device 116 could be a wireless activation device that initiates wireless communication between a key fob or mobile device with the interior assembly for purposes of authentication. Alternatively, a third input device could be provided separate from the second input device 116 that initiates wireless communication between a key fob or mobile device with the interior assembly for purposes of authentication. The exterior assembly 212 is electrically connected to the interior assembly 202 as mentioned above. The exterior assembly 212 is connected to the latch assembly 224 to manually actuate the bolt between the extended position and the retracted position. The exterior assembly is powered by the power supply 226. In the shown embodiment, the power supply 226 is connected to both of the interior assembly 202 and the exterior assembly 212. In another embodiment, there may be another power supply (not shown) that provides power to the exterior assembly 212 separately from the power supply 226.

In another embodiment, the keypad 216 may also be any other device to receive an input. In the example shown, the keypad 216 includes a wireless communication unit 218 to communicate with the interior assembly 202 and a plurality of buttons 220 to receive user input. The plurality of buttons 220 may be mechanical buttons that are configured to receive user presses of the keypad 216. The plurality of buttons 220 may also be soft buttons that a user selects on the keypad 216. In one embodiment, the plurality of buttons 220 may be a combination of both. In one embodiment, the keypad 216 has an opening to receive the exterior assembly 212 to be connected to the lockset system 200. For example, if the input device 214 is mounted on the exterior assembly 212 then the keypad 216 could have the opening to receive the input device 214 so the keypad 216 creates a flush surface between the input device 214 and the keypad 216. For example, the keypad 216 could be retrofitted with an existing electronic lock and appear integral with that lock. In another embodiment, the keypad 216 may be located in a different location than the exterior assembly 212. For example, the keypad 216 may be located on the side of the door to which the lockset system 200 is attached. In the example shown, the keypad 216 is not connected to the power supply 226. In one embodiment, the keypad 216 may have a separate power supply (not shown) to power the device. In another embodiment, the keypad 216 may be connected to the power supply 226.

In one embodiment, the keypad 216 may send the user input received through the plurality of buttons 220 to the interior assembly 202 through the wireless communication unit 218 of the keypad 216 to the wireless communication unit 210 of the interior assembly 202. The interior assembly 202 may receive the input and authenticate user-selection of the plurality of buttons 220 to validate the user input. Upon verifying the user-selection is a valid authentication code, the interior assembly 202 may send a signal to the controller 204 to actuate the motor 222 to change the position of the bolt of the latch assembly 224 between the extended and the retracted position. In another embodiment, the keypad 216 may verify the user-selection to determine if it is the valid authentication code. If it is determined to be the valid authentication code, the keypad 216 may send the valid authentication code to the interior assembly 202 to send the signal to the controller 204 to actuate the motor 222 to change the position of the bolt of the latch assembly 224 between the extended and the retracted positions.

In one embodiment, the interior assembly 202 may require inputs from both the input device 214 and the keypad 216. Similarly to lockset system 100, the input device 214 may be a user-selectable surface that initiates wireless authentication with the wireless communication unit 210. The electronic key 228 will typically need to be in close proximity to one side of the exterior assembly 212 for the input device 214 to initiate the wireless authentication. In one embodiment, the keypad 216 may only send a signal to the interior assembly 202 when the electronic key 228 is in close proximity to the keypad 216.

Figure 3:
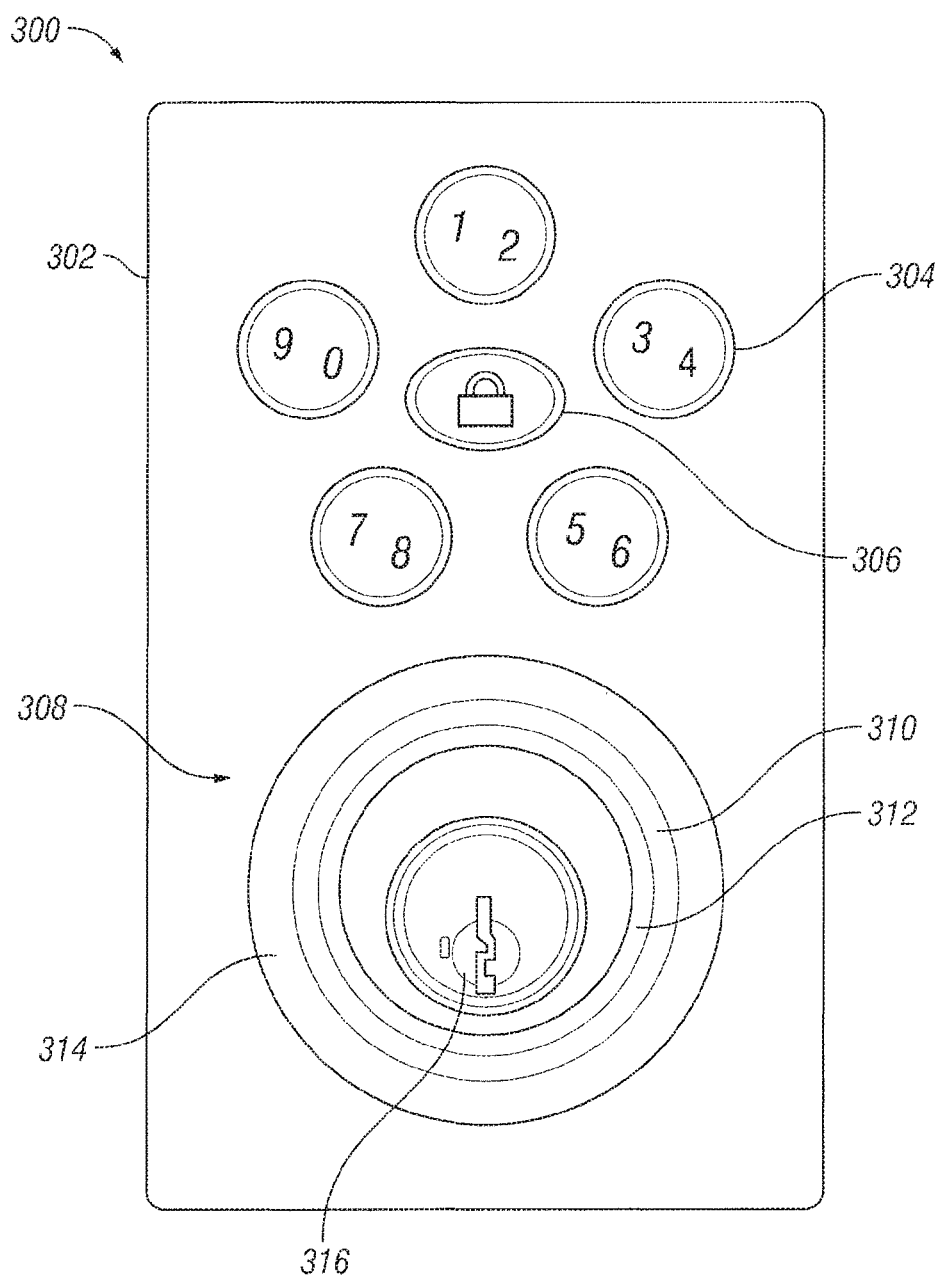
FIG. 3 is a front view of an example auxiliary authentication input device attached to an example primary authentication input device of an exterior assembly of a lockset system according to an embodiment of the disclosure.

FIG. 3 is a front view of an example input system 300 according to an embodiment of the disclosure. The input system 300 may be embodied as the combination of the exterior assembly 212 (FIG. 2) and the keypad 216 (FIG. 2). In the example shown, the input system 300 includes an auxiliary authentication input device 302 and a primary authentication input device 308 to receive user input. In the example embodiment, the auxiliary authentication input device 302 is connected to the primary authentication input device 308 to create an uninterrupted exterior surface. In the embodiment shown, the auxiliary authentication input device 302 and the primary authentication input device 308 are shaped as a rectangular object and a circular object, respectively. In other embodiments, the two devices 302, 308 may be shaped in other ways to create an uninterrupted surface.

In the embodiment shown, the auxiliary authentication input device 302 may be embodied as a keypad and include number buttons 304 and a lock button 306. The number buttons 304 are shown to be certain pairs of numbers in which the button is selected twice to select the second listed number. In other embodiments, the number buttons 304 may be a different combination of numbers. In other embodiments, the number buttons 304 may be single number buttons or other characters. In the embodiment shown, the number buttons 304 are arranged in a star shape. In other embodiments, the number buttons 304 may be arranged in different ways. The number buttons 304 are used to receive user-selection to be verified as a valid authentication code. For example, if the valid authentication code was "9075" then a user would have to press on the "90" number pair button 304 twice, the "78" number pair button 304 once, and the "56" number pair button 304 once to match the valid authentication code "9075." In other embodiments, the valid authentication code may be any amount of digits. After the user enters the matched valid authentication code, the input system 300 may send a signal to the interior assembly 202 to actuate the motor 222 (FIG. 2) to move the bolt of the latch assembly 224 (FIG. 2) from a locked position to an unlocked position. The lock button 306 is used to send a signal to the interior assembly 202 (FIG. 2) to actuate the motor 222 (FIG. 2) to change the bolt of the latch assembly 224 (FIG. 2) from the unlocked position to the locked position.

In the embodiment shown, the primary authentication input device 308 includes a capacitive touch surface 310, a light communication device 312, a rose 314, and a key hole 316. The capacitive touch surface 310 may be used to receive the user input through a wireless connection. For example, the user may initiate a wireless authentication process by touching the capacitive touch surface 310 as described above. In some embodiments, the user may also touch the capacitive touch surface 310 to lock the door. In the example embodiment, the light communication device 312 is in a ring shape. In other embodiments, the light communication device 312 may be other shapes. The light communication device 312 may notify the user of a valid authentication code or an invalid authentication code. For example, the light communication device 312 may flash blue for the valid authentication code and flash orange for an invalid authentication code. In other embodiments, the light communication device 312 may use other colors to signify a valid and an invalid authentication code. The light communication device 312 may also notify the user for authentication processes that occur on the auxiliary authentication input device 302. The rose 314 may be used to receive the user input as well. The user may also initiate the wireless authentication process by touching the rose 314. The key hole 316 is used to manually unlock the door.

Figure 4:
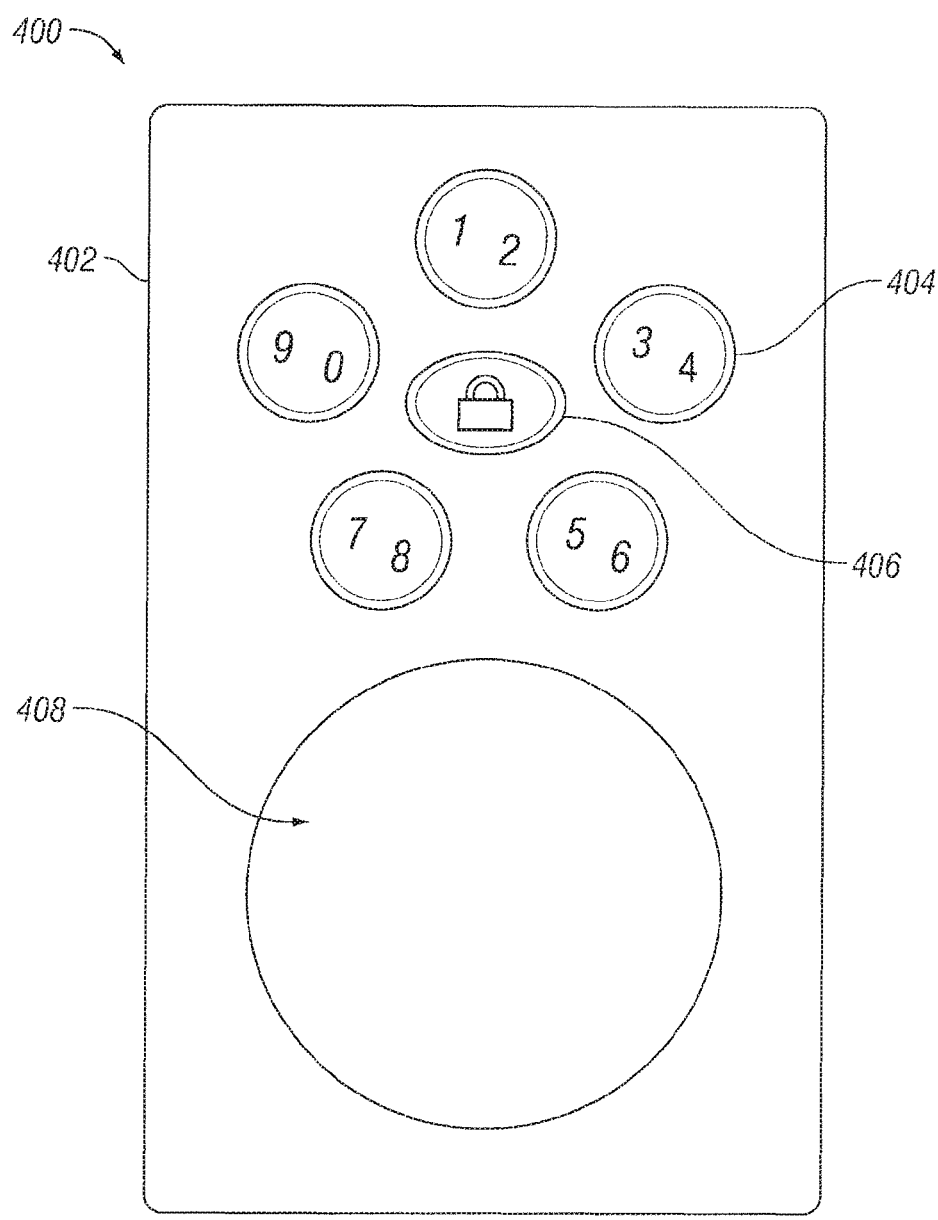
FIG. 4 is a similar view to FIG. 3 showing the example auxiliary authentication input device of FIG. 3 without the example primary authentication input device of the exterior assembly of the lockset system according to an embodiment of the disclosure.

FIG. 4 shows an input system without the primary authentication input device 308 (FIG. 3) according to an embodiment of the disclosure. In the embodiment shown, an example auxiliary authentication input system 400 is embodied as a keypad 400. The keypad 400 has a surface 402, a plurality of buttons 404, a lock button 406, and an opening 408. The surface 402 of the keypad 400 is embodied in a rectangular shape. In other embodiments, the surface 402 of the keypad 400 may be other shapes to be aesthetically pleasing. The plurality of buttons 404 are shown to be a pair of numbers arranged in a star shape. In other embodiments, the plurality of buttons 404 may be single numbers or other characters arranged in any fashion on the surface 402 of the keypad 400. The lock button 406 is used to lock the door to which the keypad 400 is attached as described above. The opening 408 is dimensioned to receive a lockset system 200 (FIG. 2). In the example embodiment, the opening 408 is shaped as a circular opening 408. In other embodiments, the opening 408 may be other shapes to receive the lockset system 200 (FIG. 2) and create an uninterrupted exterior surface between the opening 408 and the lockset system 200 (FIG. 2). This allows the auxiliary authentication input device to be retrofit with an existing electronic lockset in which the opening 408 is sized to receive the existing electronic lockset.

Figure 5:
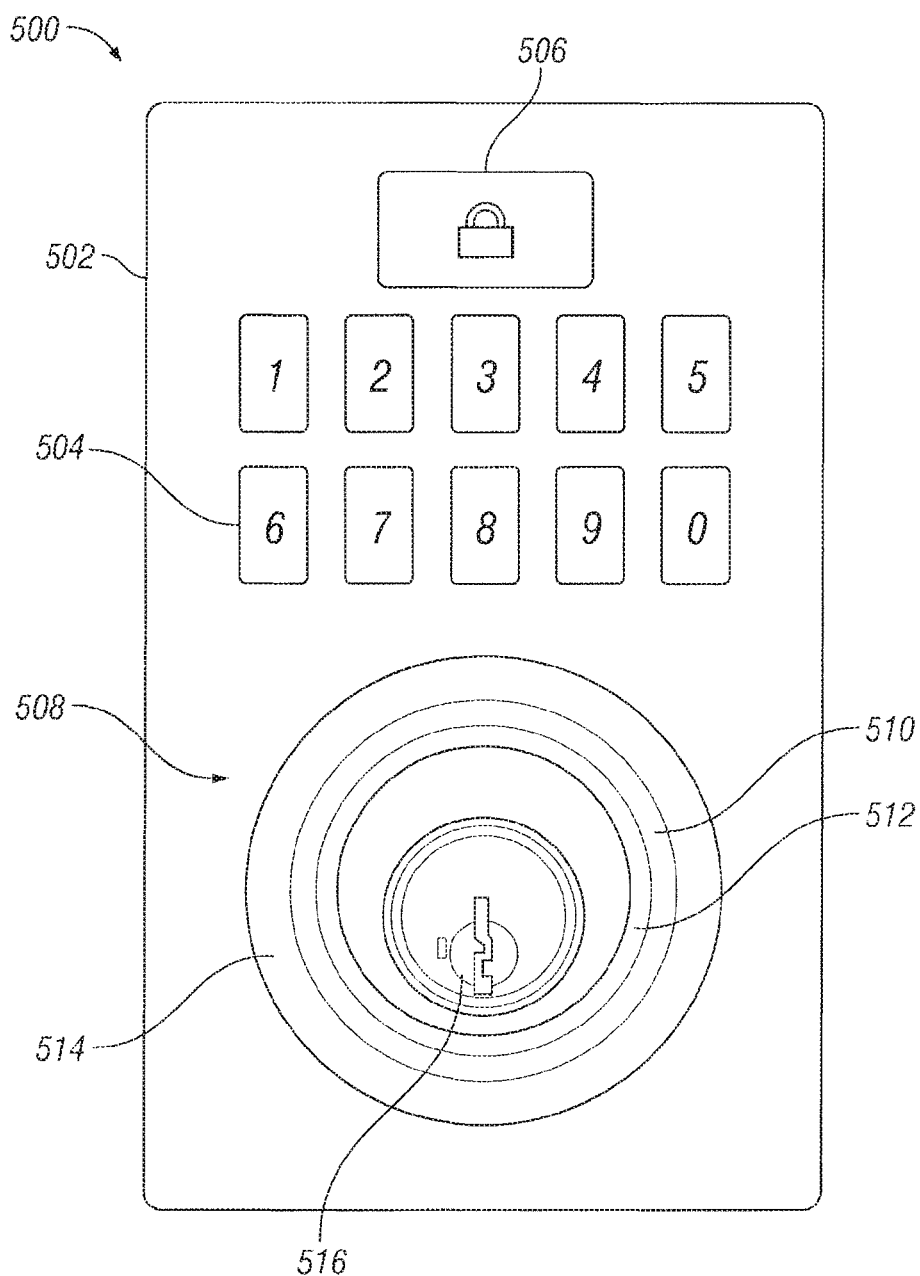
FIG. 5 is a front view of another example auxiliary authentication input device that is a part of the exterior assembly in connection with the example primary authentication input device of FIG. 3 according to an embodiment of the disclosure.

FIG. 5 is a front view of an example input system 500 according to an embodiment of the disclosure. The input system 500 may be embodied as the combination of the two input devices 114, 116 (FIG. 1) of the exterior assembly 112 (FIG. 1). The input system 500 may be embodied as an example exterior assembly 500. The operation of the exterior assembly 500 is similar in operation to the example exterior assembly 112 of FIG. 1. In the example shown, the exterior assembly 500 includes a first input device embodied as a keypad 502 and a second input device embodied as a touch surface 508 to initiate a wireless authentication (and/or other operations). In the example shown, the keypad 502 and touch surface 508 are shaped as a rectangular surface and a circular surface, respectively. In other embodiments, the keypad 502 and the 508 may be shaped differently. In this embodiment, the keypad 502 and the touch surface 508 are both integral with the exterior assembly 500.

In the example shown, the keypad 502 includes a plurality of buttons 504 to receive user input and a lock button 506 to electronically lock the door as described above. The plurality of buttons 504 are shown to be two rows of single numbers. In other embodiments, the plurality of buttons 504 may be other characters arranged in a different fashion.

In the example shown, the touch surface 508 may include a capacitive touch surface 510. As shown, the example exterior assembly includes a light communication device 512, a rose 514, and a key hole 516. The operation of the touch surface 508 is similar to the example primary authentication input device 308 (FIG. 3) described above. For example, selection of the touch surface 508, which could be located anywhere on the exterior surface of the exterior assembly, could initiate a wireless authentication process.

Figure 6:
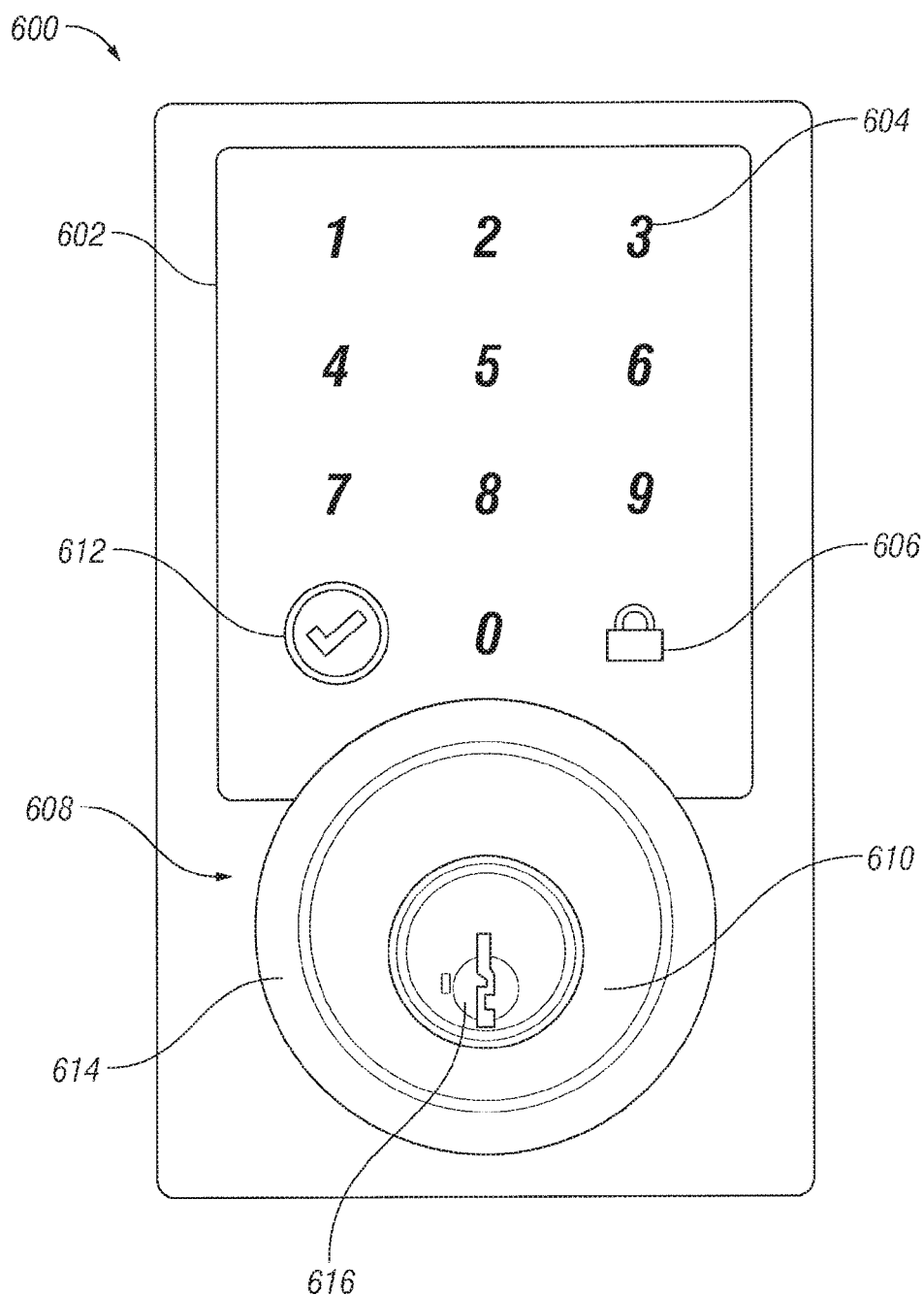
FIG. 6 is a front view of another example auxiliary authentication input device that is a part of the exterior assembly in connection with another example primary authentication input device according to an embodiment of the disclosure.

FIG. 6 is a front view of an example input system 600 according to an embodiment of the disclosure. The input system 600 may be embodied as the combination of the two input devices 114, 116 (FIG. 1) of the exterior assembly 112 (FIG. 1). The input system 600 may be embodied as an example exterior assembly 600. The operation of the exterior assembly 600 is similar in operation of the example exterior assembly 112 of FIG. 1. In the example shown, the exterior assembly 600 includes a first input device embodied as a touch keypad 602 and a second input device embodied as a touch surface 608. In the example shown, the keypad 602 and touch surface 608 are shaped as a rectangular surface and a circular surface, respectively. In other embodiments, the keypad 602 and the touch surface 608 may be shaped differently. The keypad 602 and the touch surface 608 are both integral to the exterior assembly 600.

In the example shown, the keypad 602 includes a plurality of buttons 604 to receive user input, lock button 606 to electronically lock the door as described above, and a light communication device 612 to be used as described above. The plurality of buttons 604 shown are touch areas of a touch screen numbered from 0-9. In other embodiments, the function of the plurality of buttons 604 may be achieved through other ways. In other embodiments, the plurality of buttons 604 may be arranged in a different fashion with different characters. In some cases, the plurality of buttons 604 may light up for each user press to confirm the input was received. The light communication device 612 may confirm input of a valid authentication code for both the keypad 602 and the touch surface 608 as described above.

In the example show, the touch surface 608 may include a touch capacitive surface 610. The exterior assembly could also include a rose 614 and a key hole 616. The operation of the touch surface 608 is similar to the example primary authentication input device 308 (FIG. 3) described above.

Figure 7:
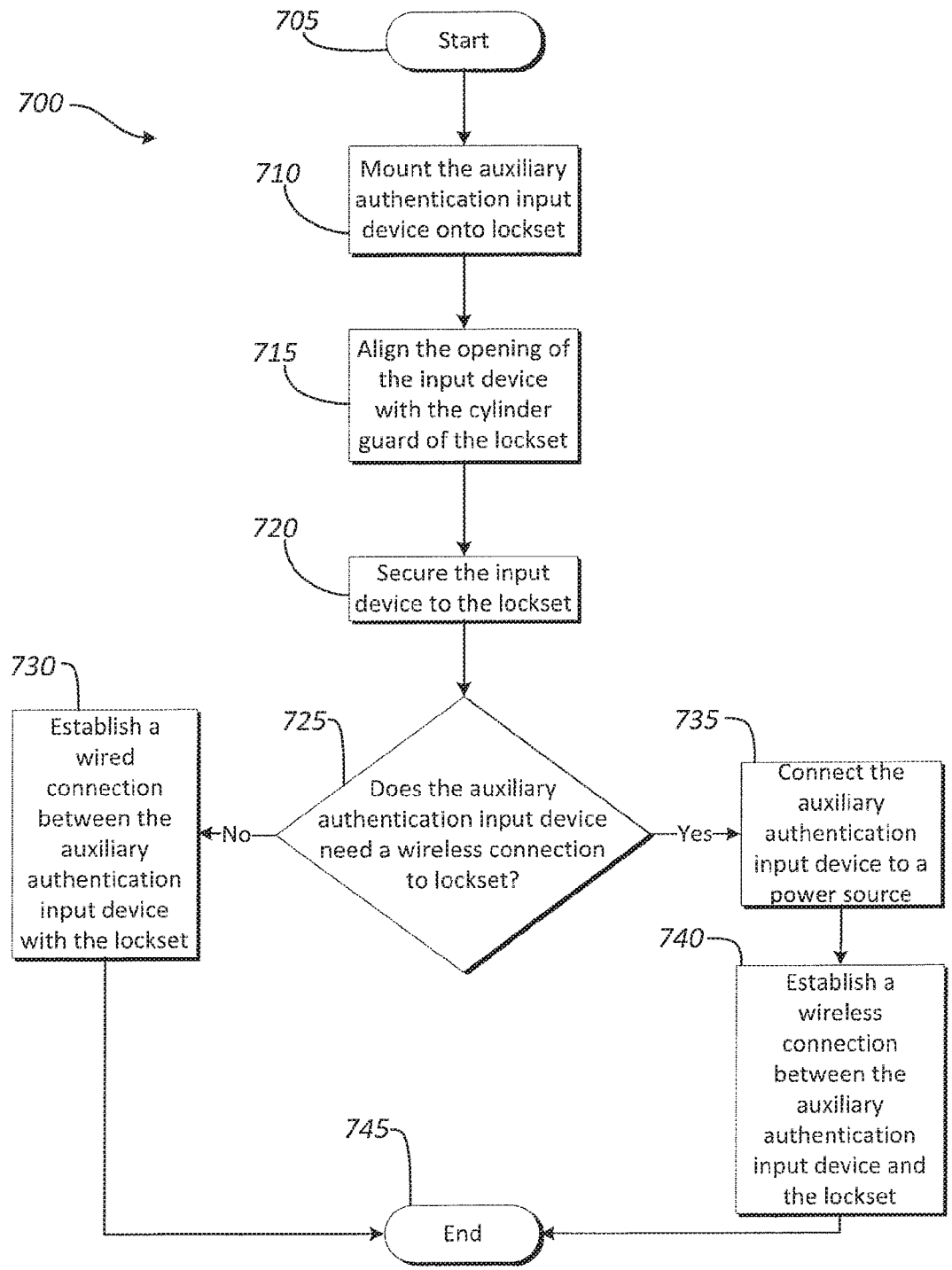
FIG. 7 is a simplified flowchart showing an example installation of the auxiliary input device onto a lockset according to an embodiment of the disclosure.

FIG. 7 is a simplified flow chart showing an example installation of the auxiliary authentication input device 302 (FIG. 3) onto the example lockset system 200 (FIG. 2) in a retrofit situation. In the shown example, the installation method 700 begins with operation 705 to initiate the process. After operation 705, the process continues on to operation 710 where an installer mounts the auxiliary authentication input device 302 (FIG. 3) to the lockset system 200 (FIG. 2). For example, the auxiliary authentication input device 302 (FIG. 3) may be mounted onto the exterior assembly 212 (FIG. 2) of the lockset system 200 (FIG. 2). After operation 710, the process continues to operation 715 where the opening of the auxiliary authentication input device 302 (FIG. 3) is lined up with the cylinder guard or rose 314 (FIG. 3) of the exterior assembly 212 (FIG. 2). After operation 715, the process continues to operation 720 where the installer secures the auxiliary authentication input device 302 (FIG. 3) to the exterior assembly 212 or door (FIG. 2).

After operation 720, the process continues to operation 725 where it is decided if the auxiliary authentication input device 302 (FIG. 3) needs a wireless connection to the lockset system 200 (FIG. 2). If the wireless connection is not needed, then the process continues to operation 730 where the installer establishes a wired connection between the auxiliary authentication input device 302 (FIG. 3) and the lockset system 200 (FIG. 2). If the wireless connection is needed, then the process continues to operation 735 where the installer connects the auxiliary authentication input device 302 (FIG. 3) to a power source 226 (FIG. 2) or other power source (not shown), such as batteries. After operation 735, the process continues to operation 740 where the installer establishes the wireless connection between the auxiliary authentication input device 302 (FIG. 3) and the lockset system 200 (FIG. 2). The wireless connection can be established by pairing the two devices. After the connection is established, the process continues on to operation 745 where the installer is finished with the installation of the auxiliary authentication input device 302 (FIG. 3) onto the lockset system 200 (FIG. 2). Although the installation method 700 is discussed with the auxiliary authentication input device 302 (FIG. 3) and the lockset system 200 (FIG. 2), the installation method 700 may apply to other embodiments.

Figure 8A:
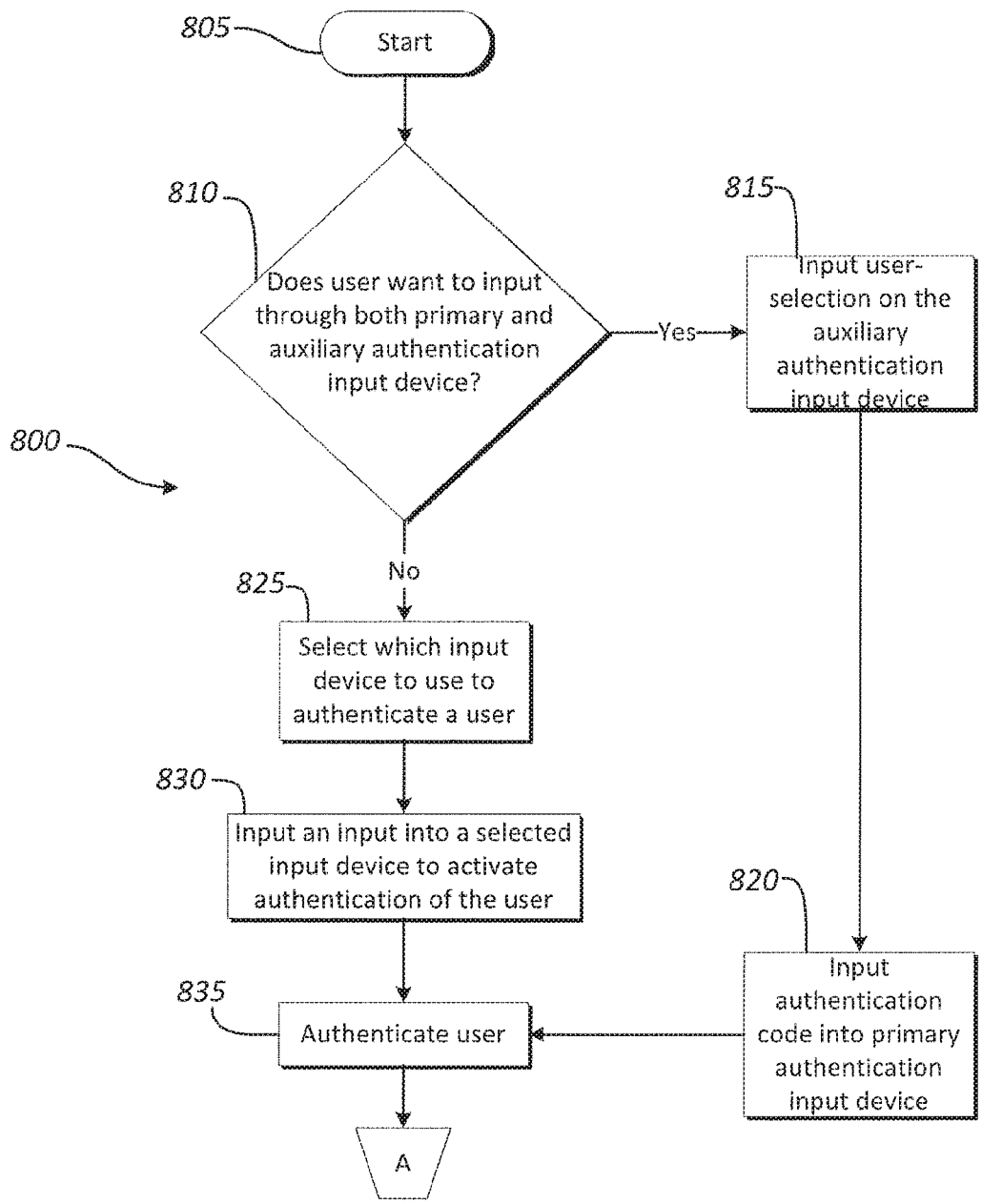
FIG. 8A is a simplified flowchart showing an example operation of the lockset system with the auxiliary authentication input device and a primary authentication input device.

FIG. 8A is a simplified flow chart showing an example operation of the lockset system 200 (FIG. 2). In the example shown, the method of operation 800 begins with operation 805 where the user begins the operation 800. After operation 805, the process continues to operation 810 where there is a check to see if the user wants to input a valid authentication code using both the primary authentication input device 214 (FIG. 2) and auxiliary authentication input device 216 (FIG. 2) embodied as a keypad 216 (FIG. 2), or one of the input devices disclosed herein. Operation 810 may be a setting for the lockset system 200 (FIG. 2) where it is set beforehand for operation 800. For example, single or dual-authentication may be set prior to the operation 800 and operation 810 serves as a check to see which setting is enabled. If the user wants to use both of the input devices, the process continues to operation 815 where the user inputs user-selection on the keypad 216 (FIG. 2). After operation 815, the process continues to operation 820 where the user inputs the authentication code into the primary authentication input device 214 (FIG. 2). Operations 815 and 820 may be switched depending on user preference. In addition, an example operation of both operations 815 and 820 is described above for the input device embodied as a capacitive touch surface 214 (FIG. 2) and a keypad 216 (FIG. 2). If the user decides to only use one device, then the process continues to operation 825 where the user selects which input device to use in order to authenticate the user. After operation 825, the process continues to operation 830 where the user inputs an input into a selected input device to activate an authentication process of the user. After operation 830, the process continues to operation 835 where the lockset system 200 authenticates the user to see if the user has input a valid authentication code as described above.

Figure 8B:
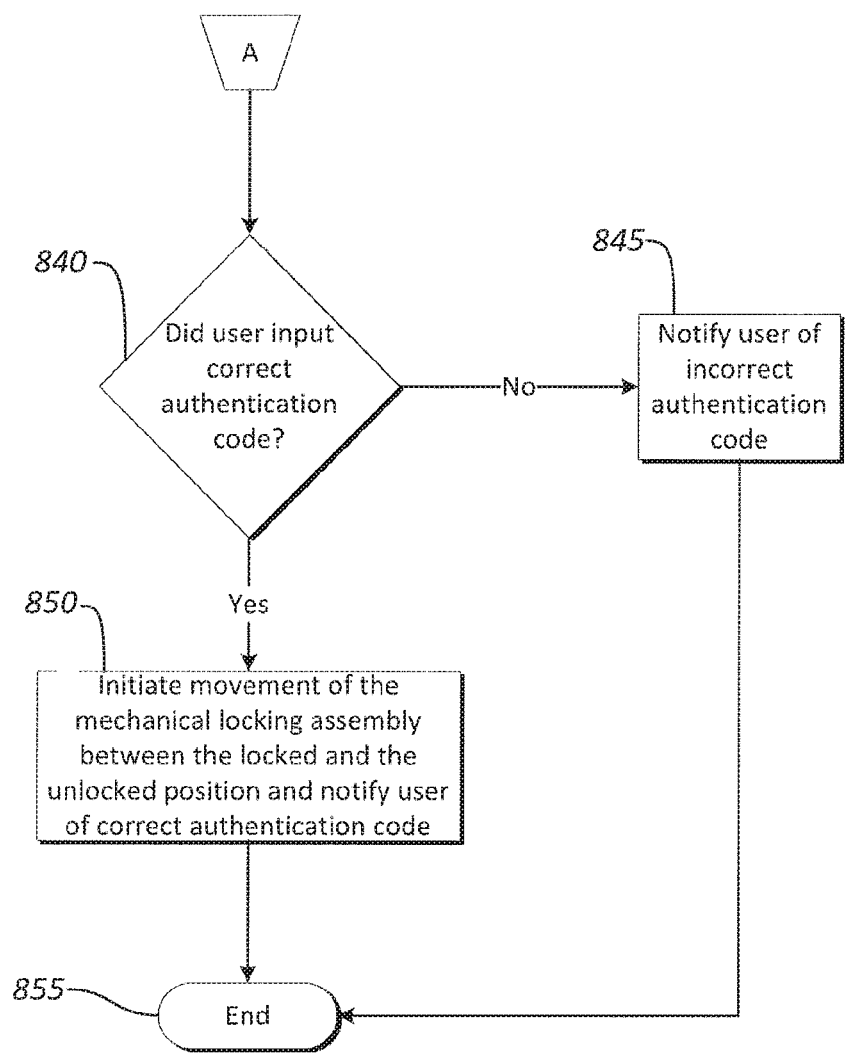
FIG. 8B is a continuation of the simplified flowchart of FIG. 8A showing the example operation of the lockset system with the auxiliary authentication input device and the primary authentication input device.

FIG. 8B is a continuation of the simplified flow chart of FIG. 8A showing the example operation of the lockset system 200 (FIG. 2). After operation 835 of FIG. 8A, the process continues to operation 840 shown in FIG. 8B where there is a check to verify the input of the user. If the user has not input the correct authentication code, then the process continues to operation 845 where the lockset system 200 (FIG. 2) notifies the user of an incorrect authentication code. The operation 845 may be performed by the light communication device 312 (FIG. 3). If the user has input the correct authentication code, then the process continues to operation 850 where the interior assembly 202 (FIG. 2) sends a signal to the controller 204 (FIG. 2) to actuate the motor 222 (FIG. 2) to change the bolt of the latch assembly 224 (FIG. 2) between the extended and the retracted positions. In addition, in operation 850, the lockset system 200 (FIG. 2) notifies the user of a correct authentication code. The operation 850 of notifying the user may be performed by the light communication device 312 (FIG. 3). After the user is notified of either an incorrect or correct authentication code, the process continues to operation 855 where the operation 800 ends.

EXAMPLES

Illustrative examples of the lockset disclosed herein are provided below. An embodiment of the lockset may include any one or more, and any combination of, the examples described below.

Example 1 is an auxiliary authentication input device for use with an electronic lockset having a primary authentication input device for inputting an authentication code that initiates movement of a mechanical locking assembly between a locked position and an unlocked position. The auxiliary authentication input device includes a keypad including a plurality of user-selectable buttons. The auxiliary authentication input device includes a wireless communication unit configured to communicate with the electronic lockset. The auxiliary authentication input device includes a controller configured to electronically transfer user-selection of the plurality of buttons as an authentication code to the lockset through the wireless communication unit.

In Example 2, the subject matter of Example 1 is further configured such that the controller sends a signal to the lockset based on user-selection on the keypad for authentication of a user to electronically control movement of the mechanical locking assembly between the locked position and the unlocked position.

In Example 3, the subject matter of Example 1 is further configured such that the plurality of buttons includes one or more of a mechanical button, a mechanical switch, a touch sensor, a capacitive sensor, an inductive element, a piezo element, and a resistive element that are configured to receive a user selects on the keypad.

In Example 4, the subject matter of Example 1 is further configured such that the plurality of buttons are soft buttons that a user selects on the keypad.

In Example 5, the subject matter of Example 1 is further configured such that the keypad defines an opening dimensioned to receive the lockset.

In Example 6, the subject matter of Example 5 is further configured such that the keypad provides an uninterrupted exterior surface between the opening in the keypad and the lockset.

Example 7 is a lockset including a latch assembly that includes a bolt movable between an extended position and a retracted position. The lockset includes a motor configured to move the bolt between the extended position and the retracted position. The lockset includes a controller configured to electronically control the motor to control movement of the bolt between the extended position and the retracted position responsive to receiving a valid authentication code. The lockset includes a wireless communication unit in electrical communication with the controller. The lockset includes at least two input devices for communicating an authentication code to the controller. The controller is configured to control movement of the bolt based on a valid authentication code received from any of the at least two input devices. At least one of the input devices comprises a keypad.

In Example 8, the subject matter of Example 7 is further configured such that at least one of the input devices includes a user-selectable surface that initiates wireless authentication with the wireless communication unit.

In Example 9, the subject matter of Example 8 is further configured such that the user-selectable surface includes one or more of a mechanical button, a mechanical switch, a touch sensor, an inductive element, a piezo element, and a resistive element.

In Example 10, the subject matter of Example 8 is further configured such that the user-selectable surface is a capacitive touch surface.

In Example 11, the subject matter of Example 7 is further configured such that, responsive to the controller receiving the valid authentication code from at least one of the input devices, the controller sends a signal to the motor to control movement of the bolt between the extended position and the retracted position.

In Example 12, the subject matter of Example 7 is further configured such that the controller is programmed to send a signal to the motor to control movement of the bolt between the extended position and the retracted position responsive to receiving authorized biometric data from the biometric sensor.

In Example 13, the subject matter of Example 12 is further configured such that the controller is programmed to initiate wireless authentication with the wireless communication unit responsive to biometric data from the biometric sensor being unauthorized.

Example 14 provides a method of installing an auxiliary authentication input device for use with an electronic lockset having a primary authentication input device for inputting an authentication code that initiates movement of a mechanical locking assembly between a locked position and an unlocked position. The method includes mounting the auxiliary authentication input device onto the lockset with a cylinder guard, the input device having an opening dimensioned to receive the lockset. The method includes lining up the opening with the cylinder guard of the lockset. The method includes securing the auxiliary authentication input device to the lockset.

In Example 15, the subject matter of Example 14 is further configured by pairing the auxiliary authentication input device with the lockset to establish a wireless communication between the auxiliary authentication input device and the lockset.

In Example 16, the subject matter of Example 15 is further configured by connecting the auxiliary authentication input device to a power source separate from the lockset.

In Example 17, the subject matter of Example 14 is further configured by establishing a wired connection between the auxiliary authentication input device and the lockset.

Example 18 provides a method of operating an auxiliary authentication input device for use with an electronic lockset having a primary authentication input device for inputting an authentication code that initiates movement of a mechanical locking assembly between a locked position and an unlocked position. The method includes selecting which input device to use to authenticate a user. The method includes inputting an input into a selected input device to activate authentication of the user. The method includes authenticating the user to initiate movement of the mechanical locking assembly between the locked position and the unlocked position.

In Example 19, the subject matter of Example 18 is further configured such that inputting the input is inputting user-selection on the auxiliary authentication input device to activate the authentication of the user.

In Example 20, the subject matter of Example 18 is further configured such that inputting the input is inputting the authentication code into the primary authentication input device to activate the authentication of the user.

In Example 21, the subject matter of Example 18 is further configured such that inputting the input is touching one or more of a mechanical button, a mechanical switch, a touch sensor, a capacitive sensor, an inductive element, a piezo element, and a resistive element of the primary authentication input device to activate authentication of the user.

In Example 22, the subject matter of Example 18 is further configured by inputting the authentication code into the primary authentication input device and inputting user-selection on the auxiliary authentication input device to active authentication of the user.

What is claimed is:

1. An auxiliary authentication input device for use with an electronic lockset having a primary authentication input device for inputting an authentication code that initiates movement of a mechanical locking assembly between a locked position and an unlocked position, the electronic lockset having a controller configured to receive an authentication setting selected from a single authentication setting and a dual authentication setting, the auxiliary authentication input device comprising:
   a keypad including a plurality of user-selectable buttons;
   a wireless communication unit configured to communicate with the electronic lockset; and
   a controller configured to electronically transfer user-selection of the plurality of buttons to the electronic lockset through the wireless communication unit;
   wherein the primary authentication input device is usable for inputting the authentication code in the single authentication setting and the dual authentication setting;
   wherein the auxiliary authentication input device is usable for inputting the authentication code in the single authentication setting and the dual authentication setting; and
   wherein the controller of the electronic lockset is configured to pair with the auxiliary authentication input device when the auxiliary authentication input device requires a wireless connection to the electronic lockset, thereby allowing for the establishment of either a wired or wireless connection between the auxiliary authentication input device and the controller of the electronic lockset at a time of installation for the auxiliary authentication input device.

2. The auxiliary authentication input device of claim 1, wherein the controller sends a signal to the electronic lockset based on user-selection on the keypad for authentication of a user to electronically control movement of the mechanical locking assembly between the locked position and the unlocked position.

3. The auxiliary authentication input device of claim 1, wherein the plurality of buttons includes one or more of a mechanical button, a mechanical switch, a touch sensor, a capacitive sensor, an inductive element, a piezo element, and a resistive element that are configured to receive user-selection on the keypad.

4. The auxiliary authentication input device of claim 1, wherein the plurality of buttons are soft buttons that a user selects on the keypad.

5. The auxiliary authentication input device of claim 1, wherein the keypad defines an opening dimensioned to receive at least a portion of the electronic lockset.

6. The auxiliary authentication input device of claim 5, wherein the keypad provides an uninterrupted exterior surface between the opening in the keypad and the electronic lockset.

7. The auxiliary authentication input device of claim 1, wherein the primary authentication input device includes a light communication device configured to provide a notification confirming input of a valid authentication code or an invalid authentication code received at either the primary authentication device or the auxiliary authentication input device.

8. A lockset comprising:
   a latch assembly including a bolt movable between an extended position and a retracted position;
   a motor configured to move the bolt between the extended position and the retracted position;
   a controller configured to electronically control the motor to control movement of the bolt between the extended position and the retracted position responsive to receiving an authentication setting selected from a single authentication setting and a dual authentication setting and at least one valid authentication code;
a wireless communication unit in electrical communication with the controller; and
at least two input devices for communicating an authentication code to the controller, wherein when the single authentication setting is selected, the controller is configured to control movement of the bolt based on a valid authentication code received from any of the at least two input devices, and when the dual authentication setting is selected, the controller is configured to control movement of the bolt based on valid authentication codes received from a plurality of the at least two input devices;
wherein the input devices include a primary authentication input device and an auxiliary input device;
wherein at least one of the input devices comprises a keypad or a biometric sensor;
wherein the primary authentication input device is usable for inputting the authentication code in the single authentication setting and the dual authentication setting;
wherein the auxiliary authentication input device is usable for inputting the authentication code in the single authentication setting and the dual authentication setting; and
wherein the controller of the lockset is configured to pair with the auxiliary authentication input device when the auxiliary authentication input device requires a wireless connection to the electronic lockset, thereby allowing for the establishment of either a wired or wireless connection between the auxiliary authentication input device and the controller of the lockset at a time of installation for the auxiliary authentication input device.

9. The lockset of claim 8, wherein at least one of the input devices includes a user-selectable surface that initiates wireless authentication with the wireless communication unit.

10. The lockset of claim 9, wherein the user-selectable surface includes one or more of a mechanical button, a mechanical switch, a touch sensor, an inductive element, a piezo element, and a resistive element.

11. The lockset of claim 9, wherein the user-selectable surface is a capacitive touch surface.

12. The lockset of claim 8, wherein the controller is programmed to send a signal to the motor to control movement of the bolt between the extended position and the retracted position responsive to receiving authorized biometric data from the biometric sensor.

13. The lockset of claim 12, wherein the controller is programmed to initiate wireless authentication with the wireless communication unit responsive to receiving biometric data from the biometric sensor being unauthorized.

14. A method for installing an auxiliary authentication input device for use with an electronic lockset having a primary authentication input device for inputting an authentication code that initiates movement of a mechanical locking assembly between a locked position and an unlocked position, the electronic lockset having a controller configured to receive an authentication setting selected from a single authentication setting and a dual authentication setting, the method comprising:
mounting the auxiliary authentication input device onto the electronic lockset with a cylinder guard, the auxiliary authentication input device having an opening dimensioned to receive the electronic lockset;
lining up the opening with the cylinder guard of the electronic lockset; and
securing the auxiliary authentication input device to the electronic lockset or another surface;
wherein the primary authentication input device is usable for inputting the authentication code in the single authentication setting and the dual authentication setting;
wherein the auxiliary authentication input device is usable for inputting the authentication code in the single authentication setting and the dual authentication setting; and
wherein the controller of the electronic lockset is configured to pair with the auxiliary authentication input device when the auxiliary authentication input device requires a wireless connection to the electronic lockset, thereby allowing for the establishment of either a wired or wireless communication connection between the auxiliary authentication input device and the controller of the electronic lockset at a time of installation for the auxiliary authentication input device.

15. The method of claim 14, further comprising connecting the auxiliary authentication input device to a power source separate from the electronic lockset when the auxiliary authentication input devices needs the wireless connection.

16. A method of operating an auxiliary authentication input device for use with an electronic lockset having a primary authentication input device for inputting an authentication code that initiates movement of a mechanical locking assembly between a locked position and an unlocked position, the method comprising:
selecting an authentication setting, the authentication setting selected from a single authentication and a dual authentication;
selecting which input device or input devices to use to authenticate a user;
when the single authentication is selected:
inputting an input into a selected input device selected from the primary authentication input device and the auxiliary authentication input device to activate authentication of the user; and
when the dual authentication is selected:
inputting a first input into a first selected input device and inputting a second input into a second selected input device to activate authentication of the user; and
authenticating the user to initiate movement of the mechanical locking assembly between the locked position and the unlocked position;
wherein the primary authentication input device is usable for inputting the authentication code in the single authentication setting and the dual authentication setting;
wherein the auxiliary authentication input device is usable for inputting the authentication code in the single authentication setting and the dual authentication setting; and
wherein the electronic lockset is configured to pair with the auxiliary authentication input device when the auxiliary authentication input device requires a wireless connection to the electronic lockset, thereby allowing for the establishment of either a wired or wireless communication connection between the auxiliary authentication input device and the electronic lockset at a time of installation for the auxiliary authentication input device.

17. The method of claim 16, wherein inputting the input is inputting user-selection on the auxiliary authentication input device to activate the authentication of the user.

18. The method of claim 16, wherein inputting the input is inputting the authentication code into the primary authentication input device to activate the authentication of the user.

19. The method of claim 16, wherein inputting the input is touching one or more of a capacitive touch surface, a mechanical button, a mechanical switch, a touch sensor, an inductive element, a piezo element, and a resistive element of the primary authentication input device to activate authentication of the user.

20. The method of claim 16, further comprising inputting the authentication code into the primary authentication input device and inputting user-selection on the auxiliary authentication input device to activate authentication of the user.

* * * * *